US010973371B2

(12) United States Patent
Illy et al.

(10) Patent No.: US 10,973,371 B2
(45) Date of Patent: Apr. 13, 2021

(54) APPARATUS FOR THE PROPORTIONED FEED OF COFFEE BEANS

(71) Applicant: ILLYCAFFE' S.P.A. CON UNICO SOCIO, Trieste (IT)

(72) Inventors: Andrea Illy, Trieste (IT); Riccardo Piras, Monza (IT); Furio Suggi Liverani, Trieste (IT); Bruno Spreafico, Ello (IT)

(73) Assignee: ILLYCAFFE' S.P.A. CON UNICO SOCIO, Trieste (IT)

( * ) Notice: Subject to any disclaimer, the term of this patent is extended or adjusted under 35 U.S.C. 154(b) by 571 days.

(21) Appl. No.: 15/542,898

(22) PCT Filed: Jan. 12, 2016

(86) PCT No.: PCT/EP2016/050477
§ 371 (c)(1),
(2) Date: Jul. 11, 2017

(87) PCT Pub. No.: WO2016/113258
PCT Pub. Date: Jul. 21, 2016

(65) Prior Publication Data
US 2017/0367537 A1    Dec. 28, 2017

(30) Foreign Application Priority Data

Jan. 12, 2015 (IT) .............................. UD2015A0002

(51) Int. Cl.
*A47J 42/50* (2006.01)
*A47J 31/42* (2006.01)

(52) U.S. Cl.
CPC ............... *A47J 42/50* (2013.01); *A47J 31/42* (2013.01)

(58) Field of Classification Search
CPC .. A47J 42/50; A47J 31/42; A47J 42/00; A47J 42/06; A47J 31/44
USPC ........................................... 99/286, 280, 287
See application file for complete search history.

(56) References Cited

U.S. PATENT DOCUMENTS

| 1,079,465 | A | * | 11/1913 | Bausman | ............... | B02C 4/286 |
| | | | | | | 241/135 |
| 4,007,675 | A | * | 2/1977 | Cailliot | ................... | A47J 42/46 |
| | | | | | | 99/286 |
| 4,065,361 | A | * | 12/1977 | Hanson | ..................... | C10G 1/02 |
| | | | | | | 196/98 |

(Continued)

FOREIGN PATENT DOCUMENTS

WO    WO-2016/026770 A2    2/2016

OTHER PUBLICATIONS

Search Report and Written Opinion for PCT/EP2016/050477, dated Feb. 22, 2016.

*Primary Examiner* — Ibrahime A Abraham
*Assistant Examiner* — Jimmy Chou
(74) *Attorney, Agent, or Firm* — Marshall, Gerstein & Borun LLP

(57) ABSTRACT

Apparatus for the proportioned feed of coffee beans includes a separator proportioner unit configured to measure out the coffee beans in individual measures; an incremental weighing unit configured to weigh a quantity of coffee beans proportioned by the separator proportioner unit; and a control card configured to receive a weight signal from the incremental weighing unit and calculate the weight of the proportioned coffee beans.

18 Claims, 4 Drawing Sheets

(56) References Cited

U.S. PATENT DOCUMENTS

| | | | | | |
|---|---|---|---|---|---|
| 4,180,718 | A * | 12/1979 | Hanson | ............... | C10G 1/00 219/700 |
| 4,779,402 | A * | 10/1988 | Duynhoven | ............... | B65B 1/36 53/502 |
| 4,789,106 | A * | 12/1988 | Weber | ............... | A47J 31/42 241/100 |
| 4,971,259 | A * | 11/1990 | Nidiffer | ............... | A47J 42/50 241/100 |
| 5,386,944 | A * | 2/1995 | Knepler | ............... | A47J 42/38 241/6 |
| 5,462,236 | A * | 10/1995 | Knepler | ............... | A47J 42/38 241/34 |
| 5,522,556 | A * | 6/1996 | Knepler | ............... | A47J 42/38 241/34 |
| 5,603,458 | A * | 2/1997 | Sandolo | ............... | A47F 1/02 241/100 |
| 5,632,449 | A * | 5/1997 | Sandolo | ............... | A47F 1/02 241/100 |
| 5,660,336 | A * | 8/1997 | Joseph, Jr. | ............... | A47J 31/42 241/27 |
| 5,690,283 | A * | 11/1997 | Sandolo | ............... | A47F 1/02 241/100 |
| 5,899,395 | A * | 5/1999 | Deklerow | ............... | B02C 19/0068 241/100 |
| 5,975,366 | A * | 11/1999 | Ridgley | ............... | A47J 47/01 222/132 |
| 5,988,052 | A * | 11/1999 | Abler | ............... | A01J 25/11 118/13 |
| 6,285,918 | B1 * | 9/2001 | Kono | ............... | G01G 19/393 53/502 |
| 6,725,889 | B2 * | 4/2004 | Perez Vales | ............... | A47F 1/035 141/104 |
| 6,783,089 | B2 * | 8/2004 | Lassota | ............... | A47J 31/42 241/30 |
| 7,350,339 | B2 * | 4/2008 | Yakushigawa | ............... | A23P 20/18 53/502 |
| 7,427,041 | B2 * | 9/2008 | Hall | ............... | B02C 19/08 241/168 |
| 7,432,479 | B2 * | 10/2008 | Avendano | ............... | G07F 9/105 219/627 |
| 7,806,042 | B2 * | 10/2010 | Frigeri | ............... | A47J 31/401 99/287 |
| 8,096,229 | B2 * | 1/2012 | Keller | ............... | A47J 31/42 99/286 |
| 8,584,714 | B2 * | 11/2013 | Gaultney | ............... | B01F 13/1005 141/83 |
| 8,776,481 | B2 * | 7/2014 | Miyahara | ............... | B65B 29/028 53/55 |
| 9,010,382 | B2 * | 4/2015 | Matye | ............... | B65B 1/06 141/103 |
| 9,675,211 | B2 * | 6/2017 | Lehotay | ............... | A47J 42/44 |
| 9,980,599 | B2 * | 5/2018 | Van Os | ............... | A47J 31/40 |
| 10,555,642 | B2 * | 2/2020 | Conti | ............... | A47J 42/36 |
| 2004/0043122 | A1 * | 3/2004 | Yakushigawa | ............... | A23P 20/18 426/519 |
| 2007/0113743 | A1 * | 5/2007 | Blair | ............... | A47J 31/10 99/504 |
| 2009/0293733 | A1 * | 12/2009 | Martin | ............... | A47J 31/60 99/280 |
| 2010/0011975 | A1 * | 1/2010 | Mazzer | ............... | A47J 31/401 99/538 |
| 2012/0024160 | A1 * | 2/2012 | Van Os | ............... | A47J 42/50 99/280 |
| 2012/0118165 | A1 * | 5/2012 | Van Os | ............... | G01F 15/06 99/286 |
| 2013/0133520 | A1 * | 5/2013 | Hulett | ............... | A47J 31/46 99/285 |
| 2013/0276637 | A1 * | 10/2013 | Stordy | ............... | A23F 5/046 99/286 |
| 2014/0123857 | A1 * | 5/2014 | Rego | ............... | A47J 42/44 99/280 |
| 2015/0201796 | A1 * | 7/2015 | Kuempel | ............... | H04L 67/10 426/231 |
| 2016/0256001 | A1 * | 9/2016 | Lehotay | ............... | A47J 42/44 |

* cited by examiner

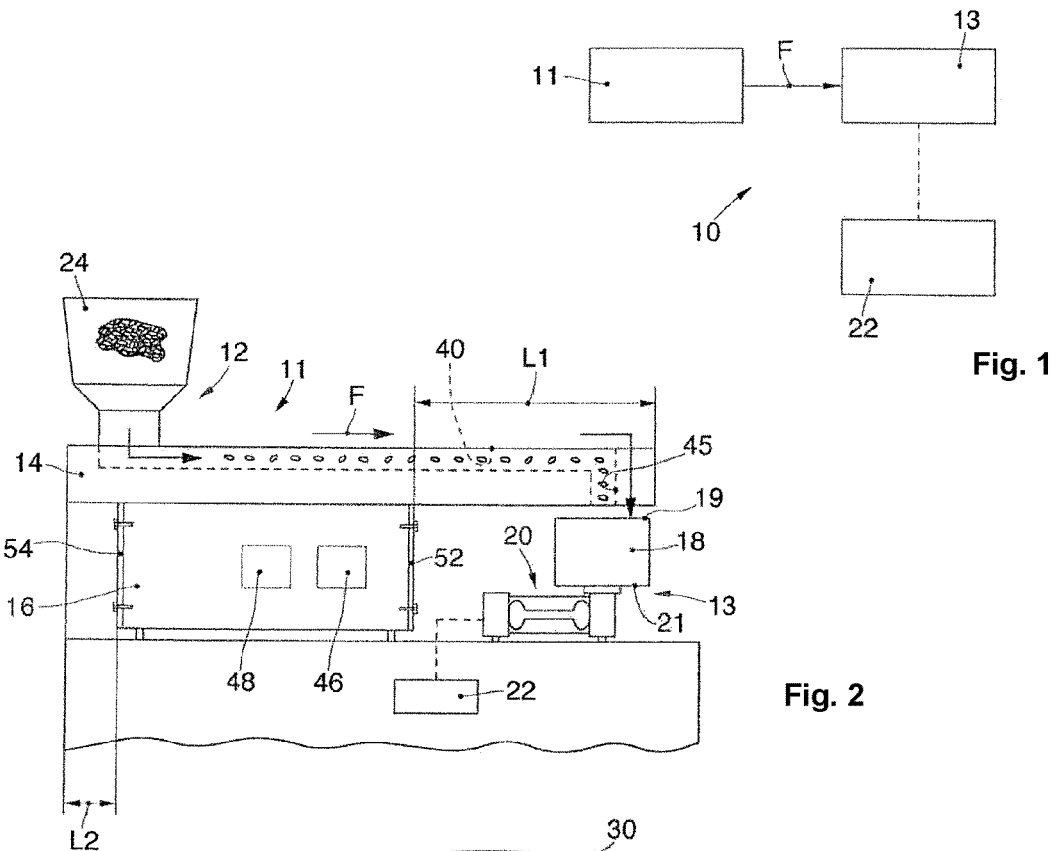
Fig. 1
Fig. 2
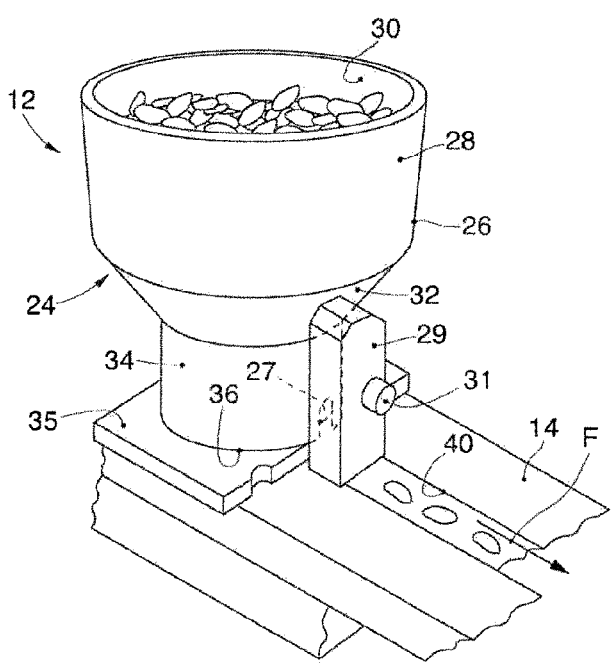
Fig. 3

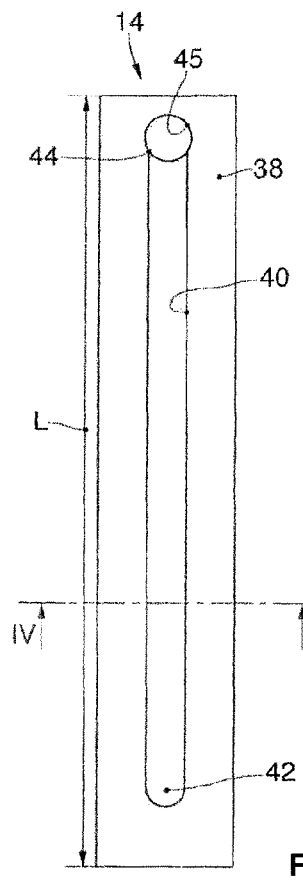
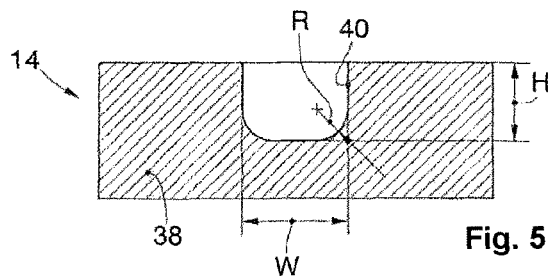
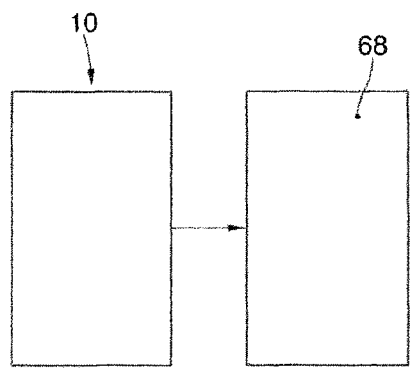
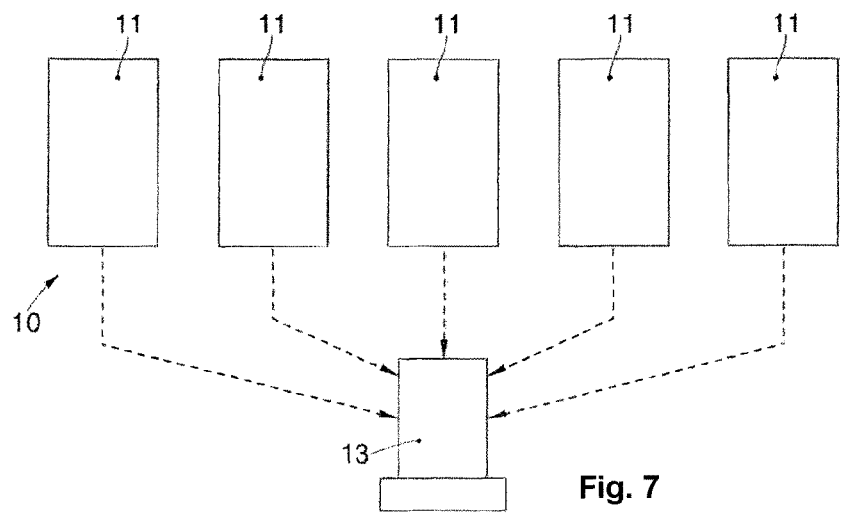

APPARATUS FOR THE PROPORTIONED FEED OF COFFEE BEANS

FIELD OF THE INVENTION

Embodiments of the present disclosure relate to an apparatus for the proportioned feed of coffee beans.

BACKGROUND OF THE INVENTION

It is known to prepare coffee drinks using coffee powder obtained by grinding coffee beans. Coffee drinks, hereafter also called simply coffee, are generally obtained by extraction, i.e., percolation with boiling and pressurized water. To this purpose, machines are known for the production of espresso coffee, which are provided with a tank for the water from which, using a pump, the water is delivered at high pressure to a heating unit. From this latter, hot water and/or steam is obtained, which is used in a coffee extraction unit where the water is percolated through the coffee powder to produce the espresso.

It is possible to use coffee powder obtained from grinding coffee beans of the same type or variety, or to use a mixture of coffee powder obtained from grinding beans of different types or varieties of coffee.

Different proportions of different types or varieties of coffee in the powdered mixture influence the organoleptic properties of the coffee prepared with them, such as the taste, aroma, acidity and body.

Coffee enthusiasts or lovers can detect even minimum variations in the organoleptic properties, which can influence their judgment of the drink and their choice or preference of one mixture of coffee powder obtained by grinding a certain selection of coffee beans of different types rather than another.

Document US-A-2012/024160 describes a coffee bean packaging cartridge to contain and supply multiple servings of coffee beans, which can be connected to a coffee beverage system.

Document U.S. Pat. No. 5,632,449 describes a custom coffee blending apparatus whereby a customer can personally blend different coffee beans to design an individualized blend. This known apparatus includes a plurality of hoppers for different types of coffee beans, each provided with an exit pipe that leads to a respective feed pipe inside which a coil feed system is provided, controlled by an electronic processor to feed the coffee beans from the different feed pipes to a central collector pipe, downstream of which a single scale is provided, a possible coffee grinder and a subsequent packaging station. The quantity of coffee beans proportioned by each of the feed pipes is controlled by controlling the speed of the electric motors that drive the coil-type feed systems and hence the respective number of revs of the latter. The feed and control system not only does not obtain a separate feed of the coffee beans but also, sometimes, is not satisfactory in the precision of the quantity of coffee beans actually proportioned, since it relies on an indirect control of the quantity correlated to the number of revs of the coil-type feed systems.

Other limitations and disadvantages of conventional solutions and technologies will become apparent to a person of skill after reviewing the remaining part of the present description with reference to the drawings and the description of the embodiments that follow, although it is clear that the description of the state of the art connected to the present description must not be considered an admission that what is described herein is already known from the state of the art.

There is therefore a need to improve an apparatus for the proportioned feed of coffee beans which can overcome at least one of the disadvantages of the state of the art.

In particular, one purpose of the present invention is to obtain an apparatus for the proportioned feed of coffee beans that can satisfy the requirements of producing, with adequate repeatability and reliability, mixtures of coffee powder obtained by grinding selections of coffee beans of different types, in particular according to personalized recipes, or which can be personalized by a user or specific operator.

Another purpose of the present invention is to obtain an apparatus for the proportioned feed of coffee beans that, once the user has identified one or more specific mixtures of coffee powder, can reproduce the specific mixtures of coffee powder with repeatability and reliability, thus satisfying the consumer's tastes.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to some embodiments, an apparatus is provided for the proportioned feed of coffee beans. According to one embodiment, the apparatus includes:
  a separator proportioner unit configured to measure out the coffee beans in individual measures;
  an incremental weighing unit configured to weigh a quantity of coffee beans proportioned by the separator proportioner unit;
  a control card configured to receive a weight signal from the incremental weighing unit and to calculate the weight of the proportioned coffee beans.

Other embodiments described herein relate to a coffee preparation station. According to one embodiment, the station comprises an apparatus for the proportioned feed of coffee beans according to the present description, a coffee grinding device and a coffee machine, able to produce the coffee drink.

Other embodiments described herein relate to a method for the proportioned feed of coffee beans. According to one embodiment, the method comprises:
  proportioning the coffee beans individually;
  weighing a quantity of proportioned coffee beans;
  receiving a weight signal and calculating the weight of the proportioned coffee beans.

Other embodiments described herein relate to a method to prepare a coffee drink.

According to one embodiment, the method comprises:
  the proportioned feed of coffee beans according to the present description;
  grinding the proportioned coffee beans to obtain coffee powder;
  compressing the coffee powder thus obtained;
  percolation with boiling water under pressure through the compressed coffee powder to prepare the coffee drink.

Other embodiments described herein relate to a computer program storable in a mean readable by a computer that contains the instructions that, once executed by an apparatus for the proportioned feed of coffee beans or in a coffee preparation station according to the present description, determine the execution of a method for the proportioned feed of coffee beans or for the preparation of a coffee drink as described here.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and features described in the present description can be applied individually wherever possible. These individual aspects, for example the aspects and features described in the attached dependent claims, can be the subject of divisional patent applications.

It is noted that any aspect or feature that is found to be already known during the patenting process is understood not to be claimed and to be the subject of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 1 is a schematic representation of an apparatus for the proportioned feed of coffee beans according to embodiments described here;

FIG. 2 is a schematic representation of an apparatus for the proportioned feed of coffee beans according to other embodiments described here;

FIG. 3 is a perspective view of part of an apparatus for the proportioned feed of coffee beans according to other embodiments described here;

FIG. 4 is a schematic representation of a part of an apparatus for the proportioned feed of coffee beans according to other embodiments described here;

FIG. 5 is a section from IV to IV of FIG. 4;

FIG. 6 is a schematic representation of an apparatus for the proportioned feed of coffee beans according to embodiments described herein combined with a coffee grinding device;

FIG. 7 is a schematic representation of an apparatus for the proportioned feed of coffee beans according to other embodiments described herein combined with a coffee grinding device;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 8:
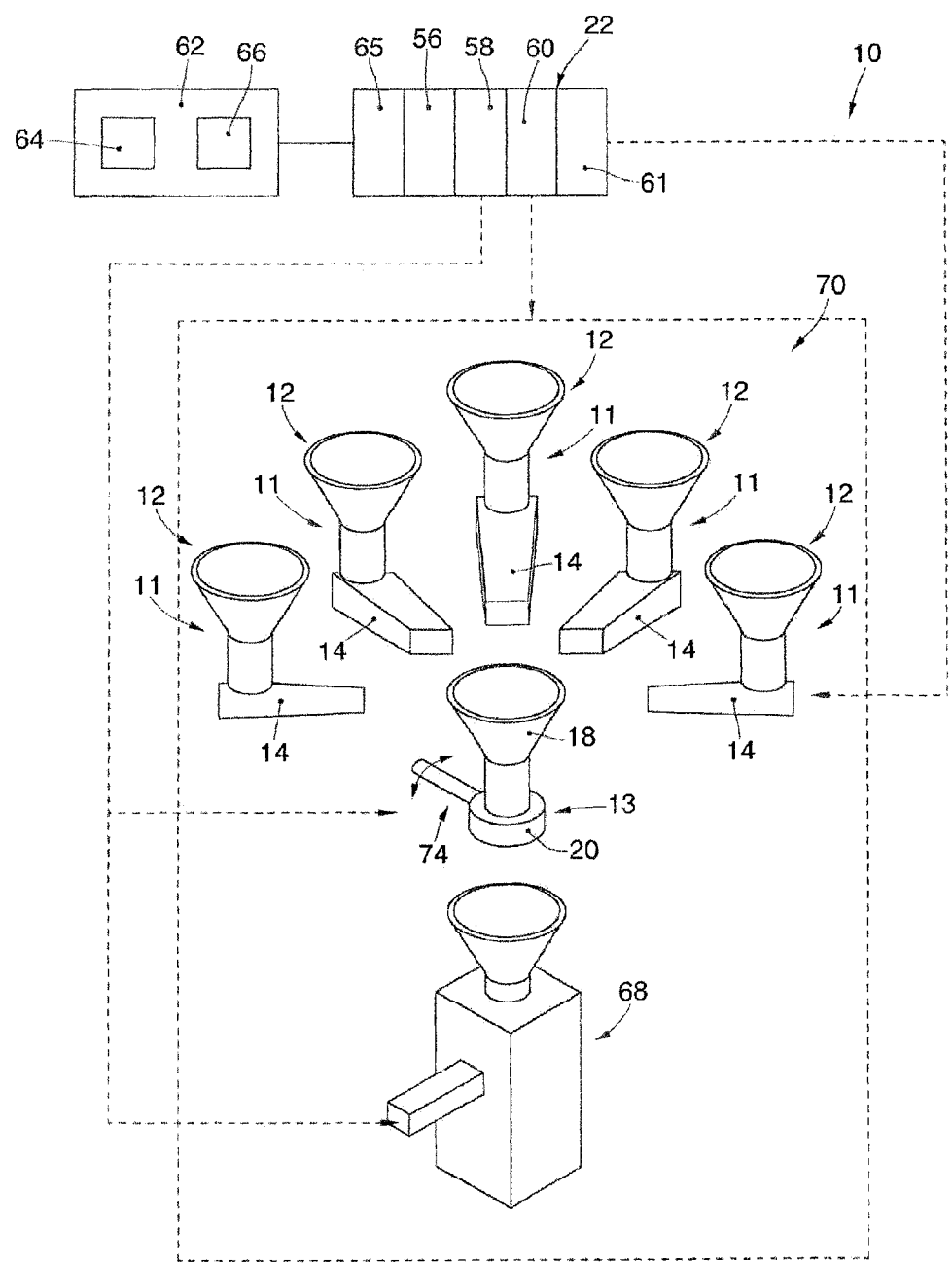
FIG. 8 is a schematic representation of an apparatus for the proportioned feed of coffee beans according to still other embodiments described herein combined with a coffee grinding device.

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative. The use of terms such as "including", "comprising", "having" and their variations is intended to include the elements listed after them and their equivalents, and also additional elements. Unless otherwise specified, terms such as "mounted", "connected", "supported" and "coupled" and their variations are used in the widest sense and include both direct and indirect assemblies, connections, supports and couplings. Furthermore, the terms "connected" and "coupled" cannot be limited to physical or mechanical connections or couplings.

Embodiments described herein relate to an apparatus 10 for the proportioned feed of coffee beans.

FIG. 1 is used to describe embodiments of the apparatus 10 which includes:
- a separator proportioner unit 11 configured to measure out the coffee beans in individual measures;
- an incremental weighing unit 13 configured to weigh a quantity of coffee beans proportioned by the separator proportioner unit 11;
- a control card 22 configured to receive a weight signal from the incremental weighing unit 13 and to calculate the weight of the proportioned coffee beans.

According to some embodiments, combinable with all the embodiments described herein, the separator proportioner unit 11 can therefore supply a separate flow, advantageously constant, of coffee beans toward the incremental weighing unit 13, determining an advance of the coffee beans in a file and in a direction of feed indicated by arrow F in FIGS. 1 and 2.

Embodiments described herein also relate to a method for the proportioned feed of coffee beans which comprises:
- proportioning the coffee beans individually;
- weighing a quantity of proportioned coffee beans;
- receiving a weight signal and calculating the weight of the proportioned coffee beans.

Embodiments described herein also relate to a method to prepare a coffee drink, which includes:
- the proportioned feed of coffee beans according to the present description;
- grinding the proportioned coffee beans to obtain coffee powder;
- compressing the coffee powder thus obtained;
- extraction, i.e. percolation with boiling water or steam under pressure through the compressed coffee powder to prepare the coffee drink.

In possible implementations, the separator proportioner unit 11 is used to proportion the coffee beans individually, the incremental weighing unit 13 is used to weigh a quantity of coffee beans proportioned by the separator proportioner unit 11 and the control card 22 is used to receive a weight signal from the incremental weighing unit 13 and to calculate the weight of the proportioned coffee beans.

Applicant has found, in the course of experimental tests, that the size, volume and weight of the coffee beans used is extremely variable: even if a constant flow is obtained, given the same flow rate, this can lead to significant fluctuations in weight. In particular, Applicant has found that, on a statistical base, there is a variability in the weight of the coffee beans from 0.08 grams to 0.16 grams. This variability in weight does not guarantee a constant weight in the final quantity, even if there is a constant flow. However, Applicant has found experimentally that, by regulating the apparatus by means of the incremental weighing unit 13 downstream of the separated flow of coffee beans, it is possible to control and regulate the final weight. In fact, the incremental weighing unit 13 can monitor the quantity of coffee beans delivered by the separator proportioner unit 11. In possible implementations, this value can be the value of weight detected a fraction of time before the end of the feed step. In this way, the apparatus 10 and the method according to the present description can be configured to deliver the quantity of coffee beans in two successive times or steps, wherein a quantity in weight that is always less than the final target weight is delivered in a first step, and the differential quantity is delivered in a second step, in a precise manner, for example by regulating the separator proportioner unit 11 to supply a slower separated flow of coffee beans, until the desired final quantity is incrementally reached. This solution is very precise in terms of the final weight reached because, since the flow of coffee beans is separated, it is possible to identify and quantify the contribution in weight of each coffee bean delivered, and consequently to regulate the flow using the control card 22. In this way, it is possible to overcome the problem of the great variability in weight of the coffee beans as discussed above, obtaining very precise, reliable and repeatable quantities in weight of coffee beans.

Consequently, the apparatus 10 allows to produce, with adequate repeatability and reliability, mixtures of coffee powder obtained by grinding selections of coffee beans of different types, in particular according to personalized recipes or recipes that can be personalized by a user or specific operator. Thanks to the apparatus 10, moreover, once the user has identified one or more specific mixtures of coffee powder, he/she can reproduce the specific mixtures of coffee powder repeatably and reliably, thus satisfying the tastes of the consumers. The apparatus 10 can be used to make a proportioner device usable in a selector device to produce personalized mixtures according to the Italian application for a patent of industrial invention n. UD2014A000146, filed on 22 Aug. 2014 in the name of the Applicant.

FIG. 2 is used to describe embodiments, combinable with all the embodiments described herein, in which the separator proportioner unit 11 can include a feed device 12 configured to feed coffee beans loosely.

According to embodiments described using FIG. 2, and combinable with all the embodiments described herein, the separator proportioner unit 11 can also include a separator transfer member 14 configured to guide the coffee beans received from the feed device 12 in a single file.

According to embodiments described using FIG. 2, and combinable with all the embodiments described herein, the separator proportioner unit 11 can also include a vibrator unit 16 configured to make the separator transfer member 14 vibrate, to determine the feed of the coffee beans in single file.

FIG. 2 can be used to describe embodiments, combinable with all the embodiments described herein, in which the incremental weighing unit 13 can include a container 18 to receive the beans transferred from the separator proportioner unit 11, for example by the separator transfer member 14.

According to embodiments described using FIG. 2, and combinable with all the embodiments described herein, the incremental weighing unit 13 can also include a sensor unit 20 configured to detect the weight force acting on the container 18.

According to embodiments described using FIGS. 2 and 3, and combinable with all the embodiments described herein, the feed device 12 can include a feed hopper 24. For example, the hopper 24 can be a cylindrical hopper. According to some embodiments, combinable with all the embodiments described herein, the hopper 24 can be made of metal, for example steel. The hopper 24 can be provided with a receptacle 26. The receptacle 26 can be configured to receive the coffee beans from a feed system (see FIG. 12 for example). The coffee beans can be supplied for example from a tank, container or can of coffee beans, or from a system to feed coffee beans provided with a store of coffee beans and a feed tube that transfers the coffee beans, for example due to gravity or pneumatically. The receptacle 26 is also connected to the separator transfer member 14, so as to allow the outflow of the coffee beans. In particular, the receptacle 26 of the hopper 24 can be coupled with the separator transfer member 14 at a right angle.

With reference to embodiments described using FIG. 3, the receptacle 26 is provided with an upper aperture 30, to introduce the coffee beans inside it; it is also provided with a lower aperture 36 to allow the coffee beans to exit toward the separator transfer member 14. In possible implementations, the receptacle 26 can be formed by a hollow body having an essentially cylindrical first section 28, which has the upper aperture 30 to introduce the coffee beans, a truncated cone intermediate section 32, to convey the coffee beans downward, and a second section 34, also essentially cylindrical but with a smaller diameter than that of the first section 28, which has the lower aperture 36 for the coffee beans to exit. The truncated cone intermediate section 32 connects the first section 28 to the second section 34, and has a bigger base diameter equal to the diameter of the first section and a smaller base diameter equal to the diameter of the second section.

According to embodiments described using FIG. 3, combinable with all the embodiments described herein, the receptacle 26 can be provided with a lateral aperture 27, preferably for the outflow of the coffee beans. The lateral aperture 27 in particular can be made in the second section 34, in correspondence with the lower aperture 36. In this case, the lateral aperture 27 can have an open profile, for example it can be shaped essentially like an upside-down U, or similar, opening in correspondence with the lower aperture 36. The lateral aperture 27 can facilitate the outflow of the coffee beans from the hopper toward the separator transfer member 14 and reduce blockages. The lateral aperture 27 can be made for example by milling. In particular, thanks to the combination of the lateral aperture 27 and the U-shaped cross section of the guide channel 40, it is possible to obtain a separated flow of coffee beans without discontinuity, blockages and points where the material stagnates.

According to some embodiments, combinable with all the embodiments described herein, the hopper 24 can be provided with a block 29 connected at the front to the lateral aperture 27, outside the receptacle 26, for example by means of a releasable attachment element 31, such as a screw. The block 29 can be a rectangular parallelepiped body or similar shape, for example with beveled or inclined corners. The block 29 can be positioned at a defined distance from the lateral aperture 27, so as to determine a passage gap to define a specific flow of coffee beans. The position of the block 29 can be regulated, and can vary in a range of distances more or less near to the lateral aperture 27, and can be set for example by acting on the releasable attachment element 31 which can therefore also function to regulate the position of the block 29. In this way, it is possible to define different flow conditions of the coffee beans.

In possible implementations, the hopper 24 can be provided with a connection flange 35, for example connected to the second section 34, for connection to the separator transfer member 14 (see FIG. 3 for example). The connection flange 35 can be welded for example to the second section 34 of the receptacle 26 and can be attached to the separator transfer member 14.

According to embodiments described using FIGS. 4 and 5, combinable with all the embodiments described herein, the separator transfer member 14 includes a bar 38 provided with a longitudinal guide channel 40. The bar 38 with longitudinal guide channel 40 functions as a track for the guided and separated advance, i.e. in a file, one by one, of the coffee beans. In this way, thanks to the sensor unit 20, it is possible to weigh the quantity of coffee beans delivered incrementally into the container 18, identifying the contribution in weight supplied by each individual coffee bean introduced into the container 18.

The guide channel 40 extends for a large part of the length of the bar 38 and has an entrance end 42, in correspondence with which the coffee beans are introduced, and an exit end 44, provided with a transverse through hole 45 (see FIG. 2 also) along the thickness of the bar 38, for the exit of the coffee beans toward the incremental weighing unit 13. The container 18 is disposed under the bar 38, in particular aligned with the exit end 44 and the respective transverse through hole 45. The transverse through hole 45 can be configured, in particular sized, with a nominal internal diameter, suitable to allow one coffee bean to transit at a time, but without causing obstructions, jams or blockages in the separated flow of coffee beans. Thanks to the transverse through hole 45, the coffee beans can fall through gravity to the container 18, which is open at the top to receive the falling coffee beans. In possible implementations, the hopper 24 is positioned in correspondence with the entrance end 42 of the guide channel 40, in particular providing that the lower aperture 36 of the receptacle 26 is positioned overlapping the entrance end 42. In this case, the receptacle 26 is positioned above the guide channel 40 so that the lateral aperture 27 faces toward the guide channel 40 itself, so that the coffee beans can flow correctly from the hopper 24 to the entrance end 42 in the guide channel 40.

In possible implementations, the bar 38 can be disposed essentially horizontal, or can be slightly inclined backward, i.e. toward the receptacle 26 of the hopper 24, by a few degrees, so as to control the outflow of coffee beans advancing in a file. In fact, with this inclination, the bar 38 is slightly rising in the direction of travel from the entrance end 42 to the exit end 44.

In possible implementations, the bar 38 can be made starting from an elongated plate, which can be made for example of metal, for example steel, or of polymer, plastic or thermoplastic materials, or suchlike. The bar 38 is worked to make an elongated groove that defines the guide channel 40. For example, the working can be done by removing material, for example milling, or it is possible to obtain the bar 38 including the longitudinal guide channel 40 directly by molding, for example in the case of polymer materials.

In possible implementations, the bar 38 can have a length L (FIG. 4), which for example can be comprised between 200 mm and 800 mm, in particular between 300 mm and 700 mm, more particularly between 400 mm and 600 mm. Examples of the length L are 450 mm, 500 mm, 550 mm.

According to some embodiments, combinable with all the embodiments described herein, the guide channel 40 can have a U-shaped or similar cross section (see FIG. 5). The U-shaped cross section is advantageous in that it allows to reduce blockages of the coffee beans along the guide channel 40. In possible implementations, the profile of the U-shaped cross section can have a channel height H and a channel width W. In possible implementations, the ratio between the channel height H and the channel width W can be comprised between 1 and 2, in particular between 1 and 1.5. For example, the channel height H can be comprised between 10 mm and 20 mm, in particular between 10 mm and 15 mm, whereas the channel width W can be comprised between 6 mm and 15 mm, in particular between 8 mm and 12 mm. In possible implementations, the profile of the U-shaped cross section can have a lower radius of curvature R. In possible implementations, the ratio between the lower radius of curvature R and the channel width W can be comprised between 1 and 3, in particular between 1.5 and 2.5. For example, the lower radius of curvature R can be less than 10 mm, in particular less than 7.5 mm, more particularly less than 5 mm. For example, the lower radius of curvature R can be comprised between 2 mm and 5 mm, in particular between 3 mm and 4 mm.

According to embodiments described using FIG. 2, combinable with all the embodiments described herein, the vibrator unit 16 can include a motor 46, a feed member 48, a front vibration springs unit 52 and a rear vibration springs unit 54, which substantially define a front vibrator section and a rear vibrator section. The front vibration springs unit 52 and the rear vibration springs unit 54 substantially perform the function of amplifying/damping the vibration deriving from the motor 46. By suitably choosing the type, number and size of the springs of each unit front vibration springs unit 52 and rear vibration springs unit 54, it is possible to configure the vibrator unit 16 to determine the desired vibration of the separator transfer member 14 and hence the desired feed of the file of coffee beans. The front vibration springs unit 52 can include for example from 2 to 5 springs, for example 3 or 4. The rear vibration springs unit 54 can include for example from 1 to 3 springs, for example 1 or 2.

In possible implementations, the vibrator unit 16 can be connected at the lower part to the separator transfer member 14. In particular, the vibrator unit 16 can be disposed under the bar 38 and, for example, the latter can protrude both from the front and the rear of the vibrator unit 16. In possible implementations, the bar 38 can protrude by a length L1 from the front of the vibrator unit 16 and can protrude by a length L2 from the rear of the vibrator unit 16 (see FIG. 2). In possible implementations, the ratio between length L1 and length L2 of the bar 38 can be comprised between 0.25 and 0.5, in particular between 0.3 and 0.45, more particularly between 0.35 and 0.4. In possible implementations, the ratio between length L2 and length L of the bar 38 can be comprised between 0.1 and 0.3, in particular between 0.15 and 0.25, more particularly between 0.18 and 0.22. For example, the bar 38 can protrude by the length L1 from the front of the front vibration springs unit 52 and can protrude by the length L2 from the rear of the rear vibration springs unit 54. A vibrator unit 16 usable in the embodiments described herein can be for example a rectilinear vibrating base, for example model VR1, available from SARG Srl (Italy).

According to some embodiments, combinable with all the embodiments described herein, the container 18 can be a receptacle, for example cylindrical in shape, which has an upper aperture 19, provided for the entrance of the coffee beans arriving from the separator transfer member 14. Furthermore, the container 18 is provided with a bottom 21, with which the sensor unit 20 can be associated. In particular, the sensor unit 20 can be mounted under the container 18, in contact with the bottom 21 (FIG. 2).

According to some embodiments, combinable with all the embodiments described herein, the sensor unit 20 can be configured to detect at least the weight force of the coffee beans that gradually fill the container 18. The sensor unit 20 can be set to detect a weight force datum or signal, which can be programmable thanks to the control card 22.

According to different implementations of the embodiments described herein, the weight force on the container 18 can be detected by one or more load cells, one or more pressure sensors or one or more other sensors, which use an extensimeter, a piezoelectric element, a piezoresistive element, a Hall effect element or suchlike. It must be considered that a pressure is the force exerted per unitary surface, so that depending on whether one or more sensors are provided as pressure sensors or force sensors or load cells, it could be necessary to consider a conversion. It must be understood that, depending on the specific disposition of the sensor unit 20, the sensor unit 20 can also include at least a pressure sensor and at least a force sensor, for example a load cell.

According to some embodiments, combinable with all the embodiments described herein, the sensor unit 20 can include at least one sensor, like a pressure sensor or force sensor, for example a load cell.

It should be noted here that one or more of the sensors included in the sensor unit 20 as used in the embodiments described herein can be at least a sensor element selected from the group comprising:
 a force sensor or transducer, like a load cell, for example a load cell with an extensimeter, a hydraulic or hydrostatic load cell, a piezoelectric load cell, a load cell with vibrating wire and a capacitive load cell;
 a pressure sensor or transducer, for example of the electronic type used to collect a force to measure deformation or deviation caused by the force applied above an area, like a sensor with piezoresistive extensimeter, a capacitive sensor, an electromagnetic sensor, a piezoelectric sensor, an optical sensor or a potentiometric sensor.

In some embodiments, supplied as a non-restrictive example, the sensor unit 20 can include one or more sensors that can be a load cell.

According to some embodiments, combinable with all the embodiments described herein, the control card 22 can be configured to receive a weight signal from the sensor unit 20, to calculate the weight of the coffee beans proportioned in the container 18.

According to some embodiments described for example using FIG. 8, combinable with all the embodiments described herein, the control card 22 can include, the central processing unit (CPU) 56, a possible electronic memory 58, possibly an electronic database 60, a feed module 61 and auxiliary circuits (or I/O) (not shown). For example, the CPU 56 can be any type of controller, microcontroller, processor or microprocessor used in the field of control, automation and management of the work or computer cycle.

The electronic memory 58 can be connected to the CPU 56 and can be one or more of those commercially available, such as a random access memory (RAM), read only memory (ROM), an erasable programmable memory (EPROM), an electrically erasable programmable ROM memory (EEPROM), floppy disk, hard disk, optical disks, CD-ROM, optical-magnetic disks, optical or magnetic cards, mass memory, solid-state memory cards or microcards or any other form of digital storage, local or remote. For example, data relating to the current weight measured, the target weight of the coffee beans to be reached, and/or the proportions of one type or variety of coffee and the other, i.e. the recipes of one or more specific mixtures of coffee, and also possible historical archive data or error data, can be stored in the electronic memory 58. Possibly, the target weight of the coffee beans to be reached, and/or the proportions of one type or variety of coffee and the other, i.e. the recipes of one or more specific mixtures of coffee, can be stored, additionally or alternatively, in the possible electronic database 60 when provided. The software instructions and the data can be for example encoded and stored in the electronic memory 58 to command the CPU 56. The auxiliary circuits can also be connected to the CPU 56 to help the processor conventionally. The auxiliary circuits can include for example at least one of: cache circuits, feed circuits, clock circuits, input/output circuits, subsystems and suchlike.

A program (or computer instructions) readable by the control card 22 can determine which tasks are performable according to the method according to the present description. In some embodiments, the program is a software readable by the control card 22 or a local or remote computer system. The control card 22 or the local or remote computer system can include a code to generate and store information and data introduced or generated in the course of the method according to the present description.

Some embodiments can provide the execution of various steps, passages and operations, as described above. The steps, passages and operations can be done at least partly with instructions performed by a machine or control card of an apparatus according to the present description which cause the execution of certain steps by a general-purpose or special-purpose processor. Alternatively, these steps, passages and operations can be performed by specific hardware components that contain hardware logic to perform the steps, or by any combination of components for programmed computers and personalized hardware components.

Embodiments of the method for the proportioned feed of coffee beans or for the preparation of a coffee drink according to the present description can be included in a program for computers that can be stored in a computer-readable mean that includes the instructions that, once performed by the apparatus for the proportioned feed of coffee beans or in a station for preparing coffee according to the present description, determine the execution of the method for the proportioned feed of coffee beans or for the preparation of a coffee drink as described herein.

In particular, elements according to the present invention can be given as machine-readable means to store the instructions which can be carried out by the machine. The machine-readable means can include, without being limited to, floppy disks, optical disks, CD-ROM, optical-magnetic disks, ROM, RAM, EPROM, EEPROM, optical or magnetic cards, propagation means or other types of machine-readable means suitable to store electronic information. For example, the present invention can be downloaded as a computer program that can be transferred from a remote computer (for example a server) to a requesting computer (for example a client), by means of data signals received with carrier waves or other propagation means, via a communication connection (for example a modem or a network connection).

According to some embodiments, combinable with all the embodiments described herein, the apparatus 10 can include a user/operator interface 62. The user/operator interface 62 can be local or remote. The user/operator interface 62 can be configured to interact with the control card 22. In particular, the user/operator interface 62 can be provided with an insertion device 64 and a display device 66 associated with the control card 22.

In possible implementations, the insertion device 64 of the user/operator interface 62 can be an alphanumerical keyboard, a push-button panel, pressure keys or buttons, touch keys or buttons, physical or virtual keys/buttons.

In possible implementations, the display device 66 of the user/operator interface 62 can be a digital display, a liquid crystal display, a touchscreen display. In this last case, the touchscreen display can integrate the functions of both the insertion device 64 and the display device 66.

According to some embodiments, combinable with all the embodiments described herein, the apparatus 10 can include a communication module 65 (see FIG. 8 for example). The communication module 65 can be used for communication with the user/operator interface 62. The communication module 65 can be part of the control card 22, or be outside it.

In possible implementations, the communication module 65 can be a cable communication module, or a wireless communication module.

For example, in the case of a cable communication module, a communication module can be provided that implements a serial connection, such as RS232, or LAN (Local Area Network).

For example, in the case of a wireless communication module, a short, medium or long range radio communication module can be provided, for example using a Wi-Fi protocol. Other possible examples can be using a Bluetooth® protocol, or Zigbee, or NFC protocol (Near Field Communication), or infrared communication protocol (for example Infrared Data Association, IrDA).

Some embodiments, combinable with all the embodiments described herein, also relate to the combination of the apparatus 10 described herein with a coffee grinding device 68 (see FIGS. 6, 8, 9, 10, 11 and 12). The coffee grinding device 68 can be regulated to obtain a desired grain size of the final mixture of coffee powder. For example, a personalized recipe of coffee powder mixture can require, or be characterized by, a specific grain size which an operator or final consumer can select on each occasion according to requirements. For example, in some possible implementations, the coffee grinding device 68 can include a regulation system to control the movement of the grinders provided to grind the coffee toward/away from each other, for example using a micrometric control system. In this way, the grinders can be disposed at a variable distance from each other to selectively define a grinding gap or pitch correlated to a desired grain size of the mixture of coffee powder to be obtained, in a reliable and precise manner. For example, the regulation can be performed manually or automatically or semi-automatically.

Some embodiments, combinable with all the embodiments described herein, can provide that the coffee grinding device 68 can be commanded and controlled remotely, advantageously to regulate the grain size of the final mixture of coffee powder as described above. The remote command and control can be obtained for example by a cable communication system, or a wireless communication system, such as a radio communication system, for example using a Bluetooth® protocol or Wi-Fi. To this purpose, the coffee grinding device 68 can include a suitable communication module. The apparatus 10 can be operatively associated with the coffee grinding device 68, for example providing that the container 18 is used to supply the proportioned quantity of coffee beans to the coffee grinding device 68, which grinds them to obtain the corresponding mixture of coffee powder. The mixture of coffee powder can be used immediately in real time, or can be packed, for example vacuum-packed, for subsequent use; this can depend on the overall quantity of mixture of coffee powder that is used, if sufficient for example for one or two doses of coffee, or more.

Some embodiments of the apparatus 10, combinable with all the embodiments described herein, can provide a plurality of separator proportioner units 11 (see FIGS. 7 and 8 for example). For example, there can be 2 or more separator proportioner units 11, for example comprised between 2 and 12, in particular between 3 and 11, more particularly between 4 and 10, still more particularly between 5 and 9. For example, 5, 6, 7, 8, 9, 10 or more separator proportioner units 11 can be provided. Each separator proportioner unit 11 can be configured to receive beans of different types or varieties of coffee and hence to supply separated flows of coffee beans of different type, variety and origin. The various separator proportioner units 11 can be used to deliver coffee beans in series or simultaneously. In the case of sequential deliveries, the incremental weighing unit 13 can measure incremental variations in weight, correcting the separator proportioner units 11 by means of the control card 22, until the required final weight is reached. In the case of simultaneous delivery, on the contrary, depending on the weight obtained, the control card 22 connected to the incremental weighing unit 13 will supply a command/impulse to one of the separator proportioner units 11, according to needs, to obtain the necessary and predetermined weight of coffee for the drink requested.

In possible implementations, the separator proportioner units 11 can all refer to an individual incremental weighing unit 13 (see FIG. 7 for example). The various separator proportioner units 11 can be configured to proportion beans of different types or varieties of coffee in a separated manner. The incremental weighing unit 13 can be put in cooperation on each occasion with the different separator proportioner units 11, receiving from them sequentially and incrementally a defined fraction of the final quantity of coffee beans provided by a specific recipe or combination of types or varieties of coffee which can be for example pre-set or selected on each occasion in the control card 22, until the desired final quantity is obtained. In particular, the sum of the fractions received incrementally in the individual incremental weighing unit 13 from the different separator proportioner units 11 constitutes the final quantity of beans of different types or varieties of coffee; the final quantity can be processed by the coffee grinding device 68, to obtain the final mixture of coffee powder, with the organoleptic properties desired by the user and correlated to the specific recipe or pre-set or selected combination of types or varieties of coffee. As described above, the coffee grinding device 68 can be configured to regulate the grain size. Furthermore, the coffee grinding device 68 can be commanded and controlled remotely, according to needs.

FIG. 8 is used to describe embodiments in which the apparatus 10 provides a plurality of separator proportioner units 11 referring to a single incremental weighing unit 13 and a movement device 74 configured to move the incremental weighing unit 13 between the various separator proportioner units 11, to receive from each of them, in sequential manner, a fraction of quantity of beans of different types or varieties of coffee. The movement device 74 can be configured to cause a movement, linear or rotatory, of the incremental weighing unit 13. The movement device 74 can also be configured to move the incremental weighing unit 13 toward the coffee grinding device 68, so as to supply the final quantity of beans of different types or varieties of coffee for grinding. For example, the movement device 74 can include two pulleys 74a around which a transmission member 74b is wound, for example a chain or belt (see FIG. 12 for example). Moreover, the movement device 74 can be configured to move, for example upend, rotate, overturn or incline the incremental weighing unit 13 so that the quantity of beans of different types or varieties of coffee is upended, introduced or transferred from the container 18 to the coffee grinding device 68. For example, to this purpose an upending member 75 (see FIG. 12 for example) can be provided, which can be formed in possible implementations by a transmission member, such as for example a belt or chain 75a, wound around a bigger pulley 75b, to which the container 18 is connected, and a smaller pulley 75c. In these embodiments too, the coffee grinding device 68 can be configured to allow to regulate the grain size and can be commanded and controlled remotely, according to needs.

In possible implementations, the movement device 74 can include a drive member 76. A drive member 76 as used in association with the embodiments described herein can be a drive member chosen from a group comprising: an electric motor, a step electric motor, a magnetic motor, a linear axle with a motor, a linear motor, such as a mechanical linear motor, a piezoelectric linear motor, an electromagnetic linear motor, an electromechanical motor, an electromagnet. For example, motors can be provided that use electromagnetism and magnetic fields for interaction between a first part formed by electric coils and a second part formed by other electric coils, or by permanent or energized magnets or a conductor. In specific possible examples, the drive member can be configured as a linear motor, for example an induction linear motor, synchronous linear motor, brushless synchronous linear motor, homopolar linear motor, voice coil linear motor, tubular linear motor or also, as we said, a piezoelectric linear motor or an electromagnet.

In possible implementations, the movement device 74 can be provided with a movement actuator 77. The drive member 76 can be connected to the movement actuator 77. In possible implementations, the movement actuator 77 can be intrinsically linear or can be configured to convert a circular movement into a linear movement. In other possible implementations, the movement actuator 77 can be intrinsically rotatory or be configured to convert a linear movement into a circular movement. In both cases, the conversion can commonly be made using types of mechanisms selected from a group consisting of: screw actuators, such as a screw jack, ball screw actuators and roll screw actuators, or wheel and axle, for example a drum, gear, pulley or shaft, actuators like a lifting cable, a winch, a rack and a pinion unit, a chain transmission, a belt transmission, rigid chain actuators and rigid belt actuators.

Some embodiments, combinable with all the embodiments described herein, can provide a plurality of separator proportioner units 11, each of which refers to its own respective incremental weighing unit 13, to control individually the actual quantity of coffee beans delivered. In this case, each incremental weighing unit 13 is put in cooperation only with a respective separator proportioner unit 11, receiving from it a defined fraction of the final quantity of coffee beans. Subsequently, the various fractions of quantity of beans of different types or varieties of coffee can be supplied, one at a time or joined beforehand, to the coffee grinding device 68, to obtain the final mixture as discussed above. To this purpose, the movement device 74 as described above can be used.

Figure 9:
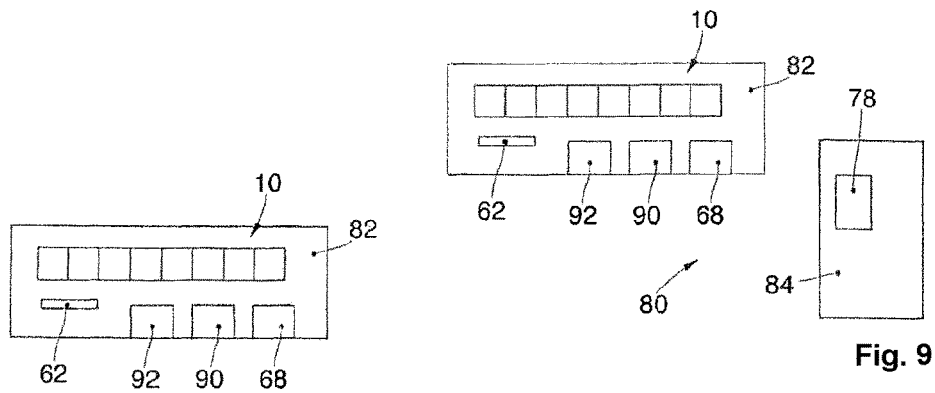
FIGS. 9, 10 and 11 are schematic representations of possible embodiments of a coffee preparation station according to the present description.
Figure 10:
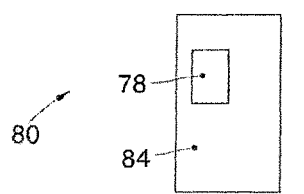
Figure 11:
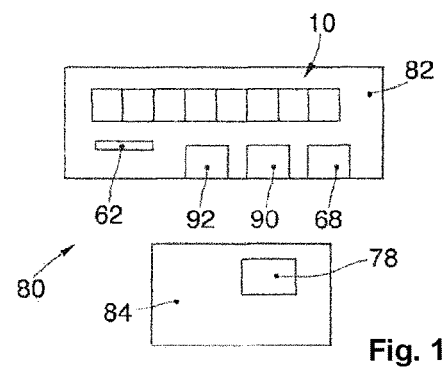

FIGS. 9, 10 and 11 are used to describe embodiments, combinable with all the embodiments described herein, of a coffee preparation station 80, which includes an apparatus 10 according to the present description, a coffee grinding device 68 and a coffee machine 78, able to produce the coffee drink, in particular espresso coffee, from the mixture of coffee powder obtained.

In possible implementations, the coffee preparation station 80 includes a coffee powder mixture preparation section 82, which includes the apparatus 10 and the coffee grinding device 68, and a coffee drink preparation section 84 which includes the coffee machine 78. FIGS. 9, 10 and 11 are used to describe various possible layouts of the coffee preparation station 80 with a different reciprocal disposition of the coffee powder mixture preparation section 82 and coffee drink preparation section 84. According to some embodiments, described using FIGS. 9 and 10, the coffee powder mixture preparation section 82 can be disposed transverse, for example orthogonal, to the coffee drink preparation section 84. The disposition of the coffee powder mixture preparation section 82 can be at the side of the coffee drink preparation section 84 (see FIG. 9) or in an intermediate position (see FIG. 10).

According to other embodiments, described using FIG. 11, the coffee powder mixture preparation section 82 can be disposed parallel, for example substantially opposite in an opposing position, to the coffee drink preparation section 84.

Figure 12:
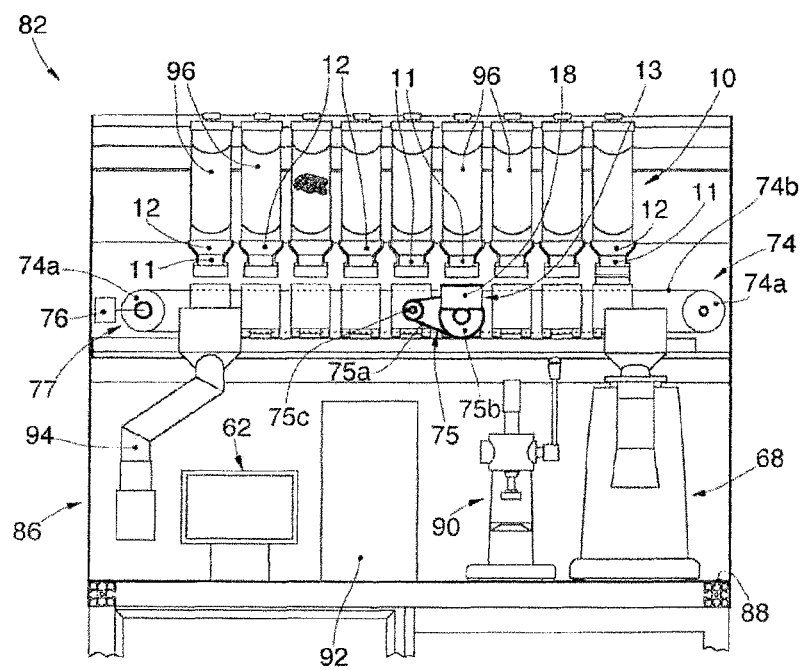
FIG. 12 is a front view of part of a coffee preparation station according to embodiments described here.

FIG. 12 is used to describe embodiments of a coffee powder mixture preparation section 82 that includes an apparatus 10 according to the present description which provides a multiplicity or array of separator proportioner units 11. The coffee powder mixture preparation section 82 includes a frame 86 that supports the apparatus 10. A plurality of transfer members 96 are provided, each coupled with a feed device 12 of a respective separator proportioner unit 11, which function as a system to feed the coffee beans. The movement device 74 is also provided, which moves the container 18 associated with the sensor unit 20 with respect to the feed devices 12. A coffee grinding device 68 is put in cooperation with the array of separator proportioner units 11, and can receive the ready mixture of coffee powder from the container 18; to this end, the upending member 75 of the movement device 74 is provided, which is configured to act on the container 18 when the latter is aligned with the coffee grinding device 68. The frame 86 comprises a support plane 88 which supports the coffee grinding device 68. A pressing device or tamper 90 can also be provided, to tamp the coffee powder, which can be disposed on the support plane 88, for example adjacent to the coffee grinding device 68. Furthermore, a vacuum packing device 92 can be provided, to vacuum pack the proportioned coffee beans or the coffee powder produced by the coffee grinding device 68 in a packet, sachet or bag, if they are not used immediately but are supplied for subsequent use. The vacuum packing device 92 can also be disposed on the support plane 88, for example adjacent to the pressing device 90. Furthermore, the user/ operator interface 62 can be provided, for example a touchscreen, also on the support plane 88. Moreover, in the event that the mixture of coffee beans weighed is not introduced into the coffee grinding device 68 and ground, but supplied as it is, a discharge system 94 can be provided, which can receive the coffee beans from the container 18 and for example transfer them or pour them into a suitable package which can then be vacuum packed, for example.

Also in the embodiments described using FIGS. 9-12, the coffee grinding device 68 can be configured to allow to regulate the grain size and can be commanded and controlled remotely.

According to other embodiments, combinable with all the embodiments described herein, the apparatus 10 and the coffee preparation station 80 can be provided with a label-printing device.

It is clear that modifications and/or additions of parts may be made to the apparatus 10 as described heretofore, without departing from the field and scope of the present invention.

It is also clear that, although the present invention has been described with reference to some specific examples, a person of skill in the art shall certainly be able to achieve many other equivalent forms of apparatus 10, having the characteristics as set forth in the claims and hence all coming within the field of protection defined thereby.

Although the above refers to embodiments of the invention, other embodiments can be provided without departing from the main field of protection, which is defined by the following claims.

In the claims that follow, the sole purpose of the references in brackets is to facilitate reading: they are not to be considered as limiting factors with regard to the scope of protection as set forth in the specific claims.

The invention claimed is:

1. An apparatus for the proportioned feed of coffee beans, comprising:
 a separator proportioner unit configured to measure out the coffee beans in individual measures;
 an incremental weighing unit configured to weigh a quantity of coffee beans proportioned by the separator proportioner unit;
 a control card configured to receive a weight signal from the incremental weighing unit and to calculate the weight of the proportioned coffee beans.

2. The apparatus according to claim 1, wherein said separator proportioner unit comprises a feed device configured to feed coffee beans loosely.

3. The apparatus according to claim 2, wherein said separator proportioner unit comprises a separator transfer member configured to guide the coffee beans received from the feed device in single file.

4. The apparatus according to claim 3, wherein said separator proportioner unit comprises a vibrator unit configured to make the separator transfer member vibrate in order to determine the feed of the coffee beans in single file.

5. The apparatus according to claim 2, wherein the feed device comprises a feed hopper.

6. The apparatus according to claim 3, wherein said feed hopper comprises a receptacle connected to the separator transfer member and provided with a lateral aperture for the outflow of the coffee beans.

7. The apparatus according to claim 3, wherein said separator transfer member comprises a bar provided with a longitudinal guide channel with a transverse through hole for the passage of the separated coffee beans toward the incremental weighing unit.

8. The apparatus according to claim 7, wherein said guide channel has a U-shaped cross section.

9. The apparatus according to claim 1, wherein said incremental weighing unit comprises a container to receive the coffee beans transferred by the separator proportioner unit.

10. The apparatus according to claim 9, wherein said incremental weighing unit comprises a sensor unit configured to detect the weight force acting on the container.

11. The apparatus according to claim 1, wherein said sensor unit comprises a load cell.

12. The apparatus according to claim 1, wherein said apparatus comprises a user/operator interface and a communication module.

13. The apparatus according to claim 1, wherein said apparatus is associated with a coffee grinding device.

14. The apparatus according to claim 1, wherein said apparatus comprises a plurality of separator proportioner units.

15. The apparatus according to claim 14, wherein said plurality of separator proportioner units are associated with a single incremental weighing unit and said apparatus comprises a movement device configured to move the incremental weighing unit between the various separator proportioner units.

16. The apparatus according to claim 14, wherein each of said separator proportioner units is associated with its own respective incremental weighing unit.

17. The apparatus according to claim 1, and further comprising a computer program storable in a medium readable by a computer that contains instructions that, once executed by a processor,
 proportions coffee beans individually;
 weighs a quantity of proportioned coffee beans;
 receives a weight signal and calculating the weight of the proportioned coffee beans;
 grinds the proportioned coffee beans to obtain coffee powder;
 compresses the coffee powder thus obtained; and
 percolates with boiling water under pressure through the coffee powder to prepare the coffee drink.

18. A coffee preparing station, comprising:
 an apparatus for the proportioned feed of coffee beans, the apparatus comprising a separator proportioner unit configured to measure out the coffee beans in individual measures, an incremental weighing unit configured to weigh a quantity of coffee beans proportioned by the separator proportioner unit, and a control card configured to receive a weight signal from the incremental weighing unit and to calculate the weight of the proportioned coffee beans; and
 wherein the coffee preparing station further comprises a coffee grinding device and a coffee machine arranged to produce a coffee drink.

* * * * *